United States Patent [19]

Chang

[11] Patent Number: 4,933,619
[45] Date of Patent: Jun. 12, 1990

[54] STEPPING MOTOR SERVO CONTROL SYSTEM FOR A FLOPPY DISK DRIVE

[75] Inventor: Chung H. Chang, Maetan-dong, Rep. of Korea

[73] Assignee: Samsung Electronics Co., Ltd., Rep. of Korea

[21] Appl. No.: 281,995

[22] Filed: Dec. 9, 1988

[30] Foreign Application Priority Data

Dec. 11, 1987 [KR] Rep. of Korea ............ 1987-14178[U]

[51] Int. Cl.⁵ ............................................. H02P 8/00
[52] U.S. Cl. ................................... 318/696; 318/685; 360/77.06
[58] Field of Search ............................... 318/696, 685; 360/77.06

[56] References Cited

U.S. PATENT DOCUMENTS 4,164,781 8/1979 Brown .............................. 360/77.06
4,775,902 10/1988 Trovato et al. .................. 318/696 X Primary Examiner—William M. Shoop, Jr.
Assistant Examiner—Saul M. Bergmann
Attorney, Agent, or Firm—Saidman, Sterne, Kessler & Goldstein

[57] ABSTRACT

A stepping motor servo control system for a floppy disk drive, which can increase the track recording density and maintain the interchangeability among different recording media because it is not necessary to pre-format any track servo control information on the media according to this system. This system includes a read/write head and at least two erase heads which are controlled to perform data reading in a track seeking mode so that signals read out by the erase heads may be used as track servo control information of the stepping motor.

2 Claims, 6 Drawing Sheets

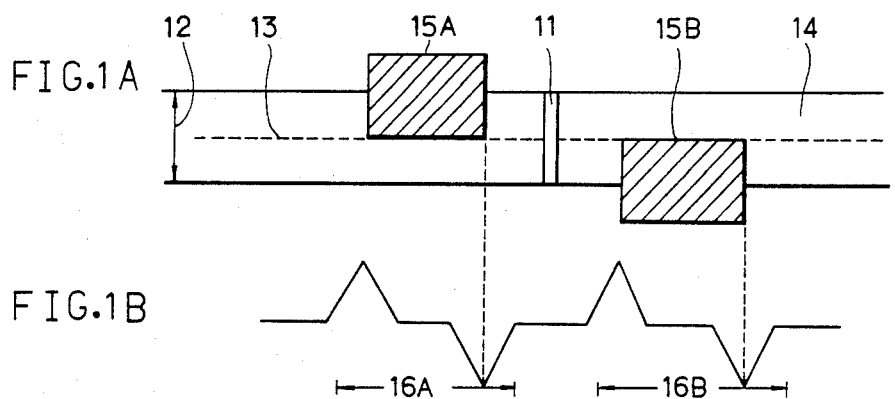
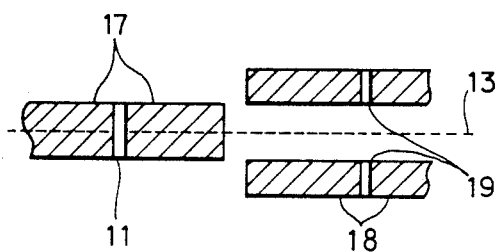

FIG. 3
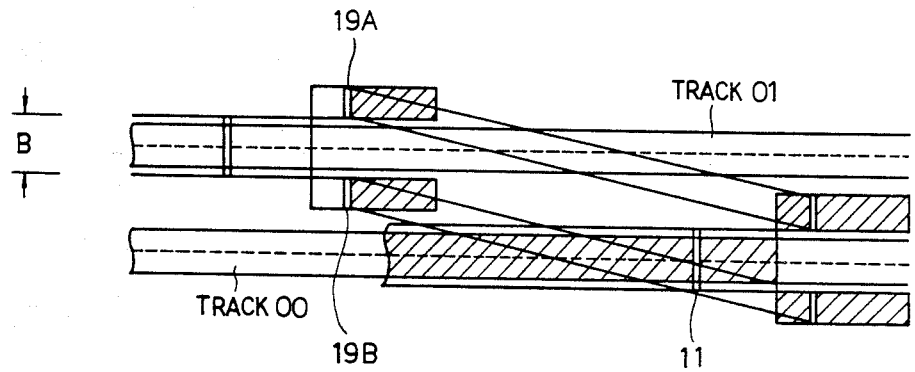
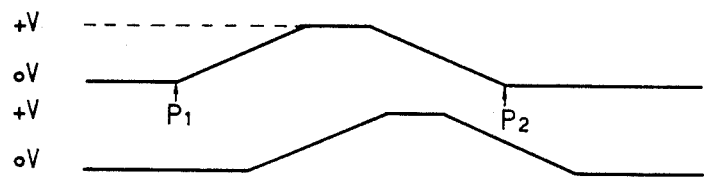
FIG. 4A
FIG. 4B

STEPPING MOTOR SERVO CONTROL SYSTEM FOR A FLOPPY DISK DRIVE

BACKGROUND OF THE INVENTION

1. Field of the Invention

The present invention relates to a stepping motor servo control system for a floppy disk drive (hereinafter called "FDD"), and more particularly, to a stepping motor servo control system which is operated by receiving feedback information from erase heads based on a closed loop servo system.

2. Description of the Related Art

FDDs have progressed rapidly from the beginning of the 1970's to the middle of the 1980's. Namely, the size of the disk has been reduced from 8 inches to 3.5 inches whereas the data recording density has increased by switching from FM to MFM (Modified Frequency Modulation). Also, single-sided disks have been replaced with double-sided disks, the track density (tracks per inch: TPI) and bits per inch (BPI) have been increased, and nowadays the recording capacity of 2M bytes with 3.5-inched disks is achieved as in an open loop servo system. In order to increase the recording density more, the track density should be increased.

Though maximum values of 96 TPI in case of 5.25-inched disk and 135 TPI in case of 3.5-inched disk with the open loop servo system are now used practically, it is impossible to increase beyond these values due to the limitation of tolerance of drive mechanism and media with respect to changes in temperature and humidity. In order to achieve the track servo function for determining the head position, all standard type FDDs have employed an open loop servo motor in view of the problems of cost and interchangeability of media.

With the closed loop servo system, it is possible to increase the track density beyond 1000 TPI as in case of Winchester disk drive (hereinafter called "WDD"), and 5-10M bytes of high capacity drive has appeared with the level of 300 TPI in the case of FDD. However, unlike the WDD, special media and accessary components are required to produce the FDD of high track density on a commercial scale. In other words, even in the case that the medium is a flexible disk, a special plastic hard case in the shape of a cartridge is necessary, and a separate servo track with information for determining the head position needs to be included when the recording medium is manufactured. Therefore, using an FDD utilizing the closed loop servo system was not apparent due to the problems of cost and the interchangeability of the recording media.

At present, dedicated servo system, embedded servo system, modified dedicated servo system, etc. are mostly used in the field of the WDD as the closed loop servo system. For all of them, the servo track information should be prerecorded on the tracks for determining a head position. Therefore, two different burst signals are recorded on both sides of the center of the track as track servo information and the determinaton of the head position is controlled by reading these burst signals. Referring to FIG. 1A, a head (not illustrated) reads burst signals 15A and 15B recorded at both sides of the center 13 of a certain track and by comparing the read burst signal levels 16A and 16B as shown in FIG. 1B, a servo motor (not illustrated) is guided to the position where the signal levels 16A and 16B become identical. Therefore, the burst signals 15A and 15B which are repeatedly recorded on the data track are continuously read out until the read levels will become identical.

SUMMARY OF THE INVENTION

It is an object of the present invention to provide a stepping motor servo control system for a FDD based on a closed servo control system, which can perform data recording of a large capacity and maintain the interchangeability among recording media without increasing the manufacturing cost compared to the conventional system.

It is another object of the present invention to provide a stepping motor servo control system which can increase the track recording density by constituting erase heads which function as read heads in a track seeking mode so that burst signals for track servo control may not be recorded on the data track.

BRIEF DESCRIPTION OF THE DRAWINGS

The present invention will now be described in more detail with reference to the accompanying drawings, in which:

FIG. 1A is a schematic diagram of the data format of the conventional servo track;

FIG. 1B is a waveform diagram of the burst signals read out according to the data format of FIG. 1A;

FIG. 2 is a schematic top view showing the head structure of the conventional FDD;

FIG. 3 illustrates the head seeking the track 00 from the track 01 according to the present invention;

FIG. 4A is a waveform diagram of the signal read out by an erase gap A;

FIG. 4B is a waveform diagram of the signal read out by another erase gap B;

DETAILED DESCRIPTION OF THE PREFERRED EMBODIMENT

Figure 5A:
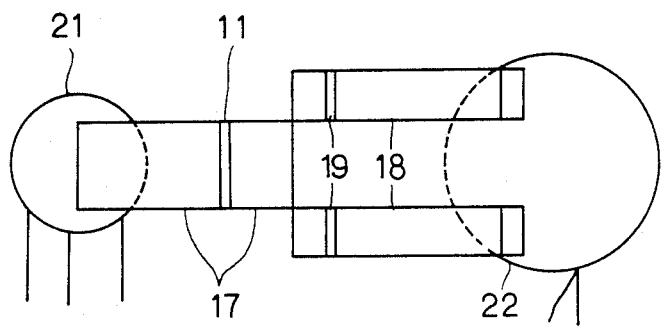
FIG. 5A is a schematic diagram showing the assembled structure of the coil and head according to the conventional system.

Referring to FIG. 2 and FIG. 5A, the structure of a tunnel erase head of the conventional FDD is illustrated. The two erase heads 18 are provided to erase the data recorded between two tracks in order to prevent data crosstalk between adjacent tracks on the writing of data.

FIG. 3 shows the head which seeks another track 00 from a track 01. The width (B) of the recorded data track is actually reduced by 10 to 15 percent because trim erase breaks out by means of each erase head on the writing of data. Therefore, the signal of zero level can be detected by the two erase heads on the reading of data as the margin of 10 to 15 percent from the data track is produced by the erase heads.

FIGS. 4A and 4B show the levels of signals read from the erase heads 19A and 19B while the heads move from the track 01 to the track 00. In the drawing, P1 indicates a seek completion point and P2 indicates a track crossing point.

According to the present invention, the signals read from the erase gaps 19A and 19B are used as feedback signals for determination of the head position in the closed loop servo control system and accordingly, it is unnecessary to write separate burst signals on the track for the servo control. The points where the signal levels in FIGS. 4A and 4B become zero indicates that the head is positioned in the center of the track without the need of comparing the signal levels as in case of embedded servo system.

In a micro-step mode, the control of the stepping motor is performed by controlling the direction and amount of the current which flows to the stepping motor, resulting in that the head mechanism moves to the inside or outside of the disk from the center of the track on the disk. The stepping motor has a predetermined step angle and one step angle is further divided into predetermined micro-steps. The control range of the micro-step of a unipolar stepping motor currently used in a FDD is between 1/10 and 1/100 of total step. This micro-stepping is controlled by means of the signals in FIGS. 4A and 4B read out by the erase heads. The control circuit for this purpose can be realized by an ordinary micro controller chip which is generally used in the field of a HDD for the closed loop servo control of the stepping motor.

Figure 5B:
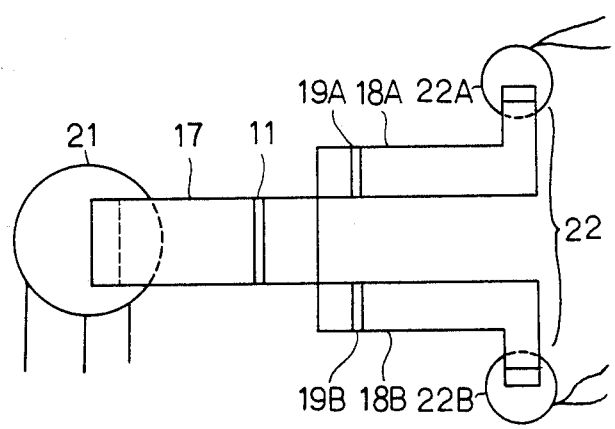
FIG. 5B is a schematic diagram showing the assembled structure of the coil and head according to the present invention.

Referring to FIG. 5B, the structure of an erase head according to the present invention is illustrated. In accordance with the invention, a read/write and erase head assembly comprises a read/write coil 21, a read/write core 17 having a read/write head gap 11 on which the coil 21 is wound, a first erase core 18A separated from the read/write core 17 and having an erase gap 19A, a first erase coil 22A wound on the first erase core 18A, a second erase core 18B opposite to the first erase core 18A, separated from the read/write core 17 and having an erase gap 19B thereon, and a second erase coil 22B wound on the second erase core 18B and opposite to the first erase coil 22A.

By separating ferrite cores of the two erase heads and winding coils thereon respectively as described above, the two erase heads can perform data reading. Also, the erase heads are controlled to read the data only during the track seeking operation as shown in FIG. 3, and the waveforms as shown in FIGS. 4A and 4B can be detected by the erase heads during the seeking operation. When the R/W head is positioned on the center of the track, two signal levels detected by the erase gaps 19A and 19B become zero, and the stepping motor servo control system completes the seeking operation. Referring to FIGS. 3 and 4, the system compares the signal levels of FIGS. 4A and 4B and moves the head inwardly or outwardly from the track center according to the result of the comparison. Thus, it is possible for the system to recognize that the R/W head is positioned on the track center at the point where the two signal levels of FIGS. 4A and 4B become zero (i.e., called as seeking completion point P1), resulting in that the track servo control of the stepping motor is achieved without recording any separate burst signal on the track as in the conventional system.

Figure 6:
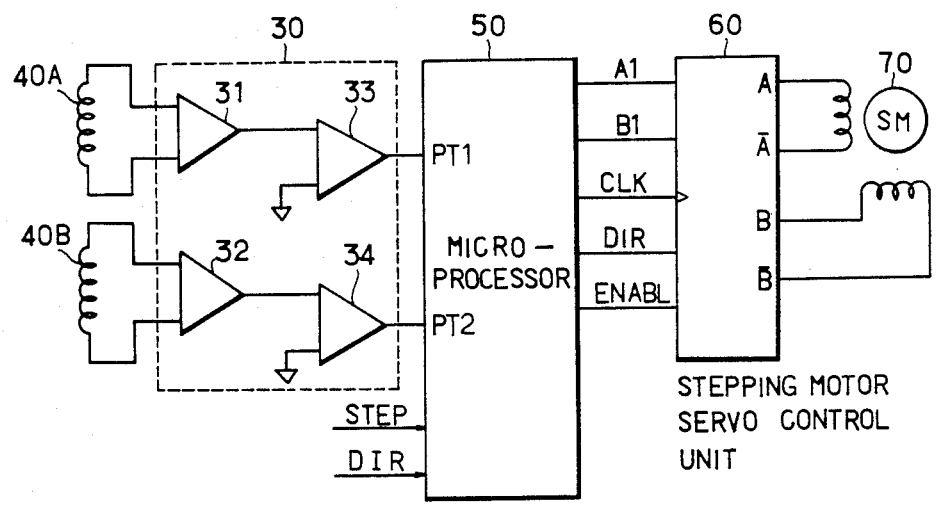
FIG. 6 is a schematic diagram of a stepping motor servo control circuit according to the present invention.

Referring to FIG. 6, the control circuit according to the present invention is illustrated. An amplifying and comparing unit 30 which includes two operational amplifiers 31 and 32 and two comparators 33 and 34 can be realized by a conventional integrated circuit "MC 3405" available from "Motorola" company. An integrated circuit "T 8474" available from "Toshiba" company can be used as a stepping motor control unit 60 in FIG. 6.

Figure 7:
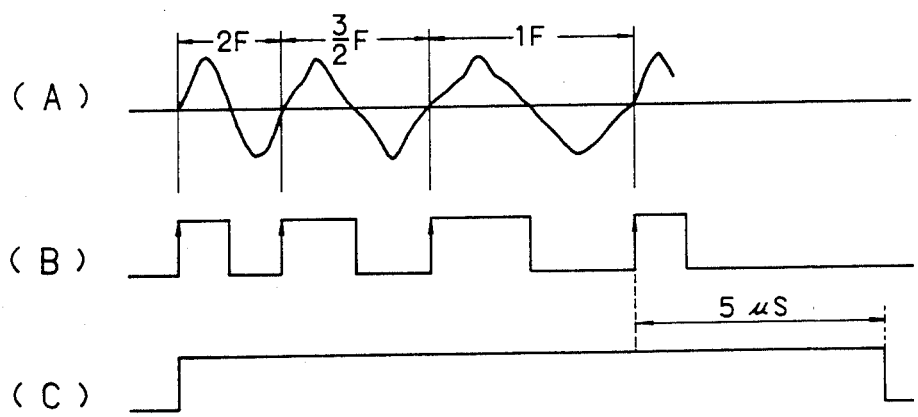
FIG. 7 is a timing chart for depicting the waveforms appearing at various points in FIG. 6.

The operation of the control circuit will now be described. The signals read out by two erase heads 40A and 40B are very weak signals of several mV, and the signals shown in FIG. 7A can be obtained by amplifying the weak signals over 100 times. The frequencies used in reading and writing of data are such that 1 F=250 kHz, 3/2 F=375 kHz and 2 F=500 kHz, and the combined signal of these three frequencies is the output of the respective operational amplifiers 31 and 32 as shown in FIG. 7A. This amplified signal is input to the comparators 33 and 34, and the output of the respective comparators is shown in FIG. 7B. By delaying 10 $\mu$S from the rising edge of the signal shown in FIG. 7B by constituting an external one-shot multivibrator circuit, a digital waveform shown in FIG. 7C can be obtained. The reason to delay the digital signal by 10 $\mu$S is that one period of the maximum transition of the signal shown in FIG. 7B is 4 $\mu$S in case that 1 F=250 kHz, and when a certain signal is read by the erase heads in the case of delaying 5 $\mu$S (which is sufficiently longer than 4 $\mu$S), the result of "[signal of FIG. 7A] (OR/AND) [signal of FIG. 7B]" becomes the signal as shown in FIG. 7C.

In this moment, a microprocossor 50 determines only the logic state of the enable signal ENABL output to the stepping motor control unit 60 according to the logic states of the input ports PT1 and PT2. Then, the microprocessor 50 memorizes the number of steps for the movment of the head by counting the input step signals and storing the counted value in the register therein. The microprocessor recognizes the rotating direction of the stepping motor according to the rotating direction recognition signal DIR input from the stepping motor control unit 60. The outputs A1 and B1 of the microprocessor are the signals to control the movment of the stepping motor by counting the number of input steps.

Figure 8:
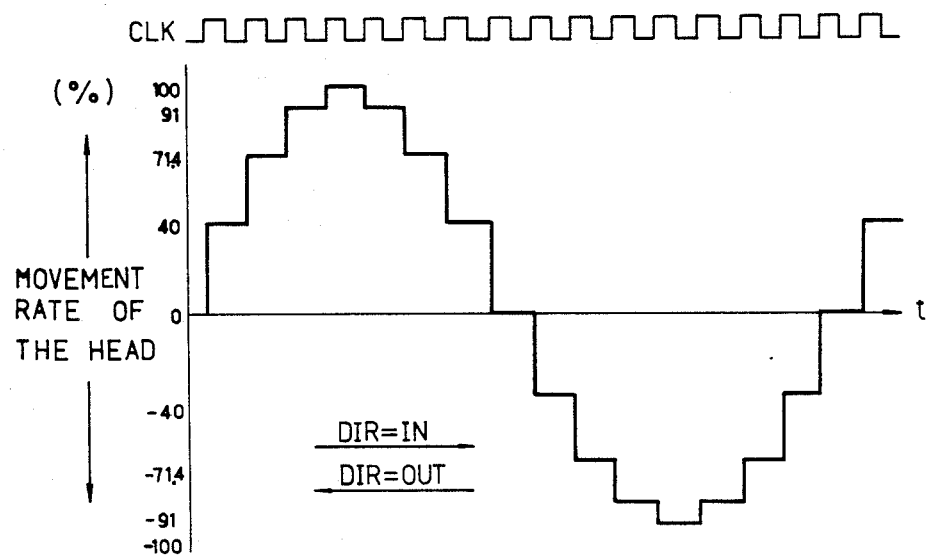
FIGS. 8A and 8B are timing diagrams showing the movement rate of the head during its seeking operation according to the present invention.
Figure 8:
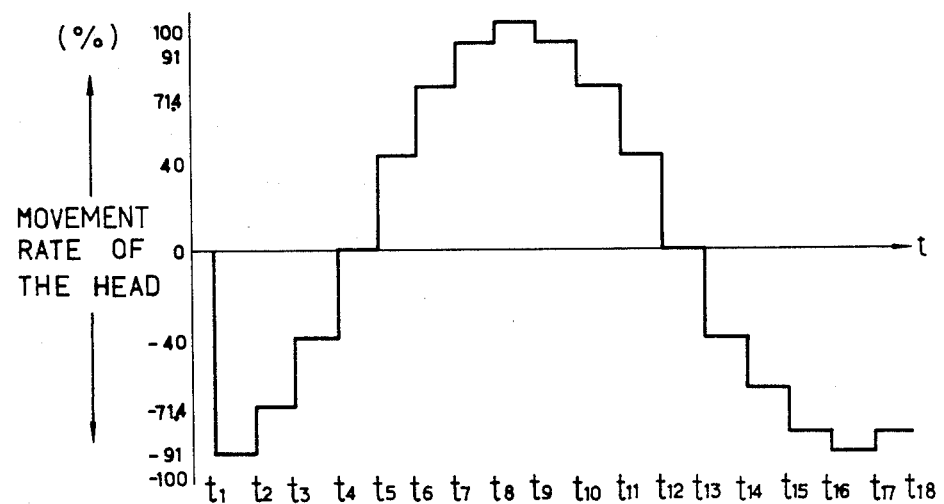

When the outputs A1 and B1 are both "high" level, the stepping motor 70 is controlled to move to 1 step by 1 pulse; when $A_1$ is "high" level and $B_1$ is "low" level, the stepping motor moves to 2 steps by 1 pulse; when $A_1$ is "low" and $B_1$ is "high", the stepping motor moves to 1 step by 2 pulses; and when outputs $A_1$ and $B_1$ are both "low", the stepping motor moves 3 steps by 2 pulses. The logic combination of these signals A1 and B1 can be controlled by the microprocessor and this important function can ensure the interchangeability of diskettes having different track densities. The clock signal CLK output to the stepping control unit 60 determines the number of the micro-steps divided from one full-step in the micro-step mode. In other words, the amount of the current applied to the stepping motor 70 is controlled according to the clock signal. FIGS. 8A and 8B illustrate the movement rate of the head which corresponds to the amount of the current by percent applied from the control unit 60 to the stepping motor as the phase signals A and B thereof when 4 clocks for 1 step movement are output to the control unit. The amount of the phase current increases or decreases according to the logic state of the rotating direction recognition signal DIR.

Figure 9:
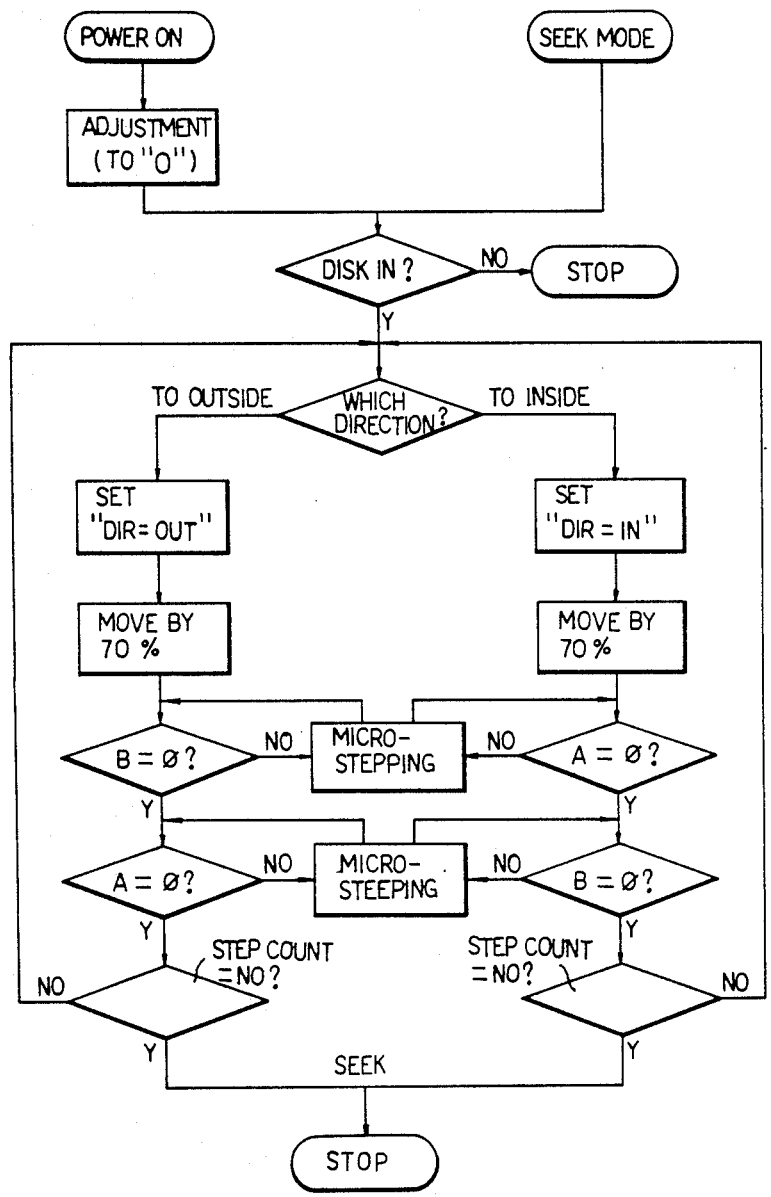
FIG. 9 is a flow diagram illustrating the control program incorporated in the present invention.

Referring to FIG. 9, the control program of the microprocessor for the servo stepping control is shown. As can be seen in FIG. 9, the microprocessor performs the necessary control during the head seeking operation according to the present invention.

As described above, the present invention provides the advantage that any pre-formatting of recording media for the stepping motor servo control of a FDD is unnecessary. Thus, interchangeability among different recording media is maintained, and data recording of a large capacity can be achieved without increasing the manufacturing cost compared to the conventional system.

What is claimed is:

1. A stepping motor servo control system for a floppy disk drive for manipulating a diskette having a plurality of tracks, comprising:
    a read/write head comprising:
        a read/write coil; and
        a read/write core having a read/write head gap on which said read/write coil is wound;
    at least two erase heads comprising:
        a first erase core separated from said read/write core and having a first erase gap;
        a first erase coil wound on said first erase core;
        a second erase core separated from said read/write core, positioned opposite to said first erase core and having a second erase gap;
        a second erase coil wound on said second erase core and positioned opposite to said first erase coil;
    means for controlling said erase heads to perform data reading in a track seeking mode for positioning said read/write head to a specified track; and
    means for controlling said erase heads for arranging signals read by said erase heads to be used as track servo control signals for positioning said read/write head at the center of said specified track.

2. A stepping motor servo control system for a floppy disk drive for manipulating a diskette having a plurality of tracks, comprising:
    a read/write head comprising:
        a read/write coil; and
        a read/write core having a read/write head gap on which said read/write coil is wound;
    at least two erase heads comprising:
        a first erase core separated from said read/write core and having a first erase gap;
        a first erase coil wound on said first erase core;
        a second erase core separated from said read/write core, positioned opposite to said first erase core and having a second erase gap;
        a second erase coil wound on said second erase core and positioned opposite to said first erase coil;
    a circuit for controlling said erase heads to perform data reading in a track seeking mode for positioning said read/write head to a specified track; and
    said circuit also for controlling said erase heads for arranging signals read by said erase heads to be used as track servo control signals for positioning said read/write head at the center of said specified track,
    wherein said circuit comprises:
        an amplifying and comparing unit for receiving input signals from said erase heads and outputting discrete signals based upon said input signals from said erase heads;
        a microprocessor responsive to said discrete signals from said amplifying and comparing unit, said microprocessor for determining the position of said erase heads, and for calculating a new position for said read/write head; and
        a control unit responsive to said output signals from said microprocessor, for manipulating said read/write head to the new position in small, descrete units.

* * * * *